(12) United States Patent
Bowen

(10) Patent No.: US 7,727,401 B2
(45) Date of Patent: Jun. 1, 2010

(54) SELECTIVE PURIFICATION OF MONO-TERPENES FOR REMOVAL OF OXYGEN CONTAINING SPECIES

(75) Inventor: Heather Regina Bowen, Vista, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1181 days.

(21) Appl. No.: 10/984,108

(22) Filed: Nov. 9, 2004

(65) Prior Publication Data

US 2006/0100470 A1    May 11, 2006

(51) Int. Cl.
*B01D 15/08* (2006.01)
*C07C 7/00* (2006.01)

(52) U.S. Cl. .............. 210/656; 585/350; 585/800; 585/820; 585/823; 585/6.3; 252/570

(58) Field of Classification Search .............. 210/198.2, 210/257.1, 638, 656, 660, 670, 671, 677, 210/678; 585/469, 800–804, 820, 822, 833, 585/836, 350, 823, 6.3; 134/1.1; 205/200; 222/639; 252/578, 570; 427/226; 549/480; 426/425, 651
See application file for complete search history.

(56) References Cited

U.S. PATENT DOCUMENTS

| 2,316,299 | A | * | 4/1943 | Thompson ................ 252/578 |
| 2,585,492 | A | * | 2/1952 | Olsen ...................... 585/822 |
| 2,723,756 | A | * | 11/1955 | Miller et al. ............ 210/656 |
| 2,930,821 | A | * | 3/1960 | Schwoegler et al. ...... 585/804 |
| 3,305,591 | A | * | 2/1967 | Epstein et al. ........... 568/829 |
| 3,546,256 | A | * | 12/1970 | Zimmerman .............. 549/480 |
| 3,558,732 | A |   | 1/1971 | Neuzil |
| 3,625,733 | A | * | 12/1971 | Mansur et al. ............ 427/226 |
| 3,723,302 | A |   | 3/1973 | Pharis et al. |
| 3,778,486 | A |   | 12/1973 | Hamby, Jr. |
| 3,846,297 | A | * | 11/1974 | Thaw ...................... 210/656 |
| 3,869,067 | A | * | 3/1975 | Ashmead et al. .......... 222/639 |
| 4,197,328 | A | * | 4/1980 | Sprecker et al. .......... 426/536 |
| 5,061,502 | A |   | 10/1991 | Cully et al. |

(Continued)

FOREIGN PATENT DOCUMENTS

EP    0979806 A1    2/2000

(Continued)

OTHER PUBLICATIONS

Greg Swords and G. L. K. Hunter, Composition of Australian Tea Tree Oil (Melaleuca alternifolia), 1978 American Chemical Society, vol. 26, No. 3 1978, pp. 734-737, Corporate Research & Development Department, The Coca Cola Company, Atlanta, Georgia 30301. Downloaded from the Internet on Jun. 18, 2009.*

(Continued)

*Primary Examiner*—Joseph W Drodge
(74) *Attorney, Agent, or Firm*—Rosaleen P. Morris-Oskanian

(57) ABSTRACT

A process for purifying monoterpenes, including the steps of: providing a monoterpene comprising alpha terpinene of about 90% or greater purity and comprising an oxygen-containing impurity compound selected from the group consisting of 1,8-cineole, 1,4,-cineole, and mixtures thereof; providing an activated silica gel preparative chromatographic column; contacting the monoterpene with the column, wherein the oxygen-containing impurity compounds are retained on the column; recovering monterpenes depleted of oxygen-containing impurity compounds from the column by applying a pressure above atmospheric from a gas source without the use of a solvent; and removing the oxygen-containing impurity compounds by contacting the column with an alcohol.

11 Claims, 3 Drawing Sheets

U.S. PATENT DOCUMENTS

| | | | |
|---|---|---|---|
| 5,847,246 A * | 12/1998 | Hsu et al. | 585/1 |
| 6,086,782 A * | 7/2000 | Hsu et al. | 252/73 |
| 6,447,816 B1 * | 9/2002 | Vail et al. | 424/742 |
| 6,572,905 B2 * | 6/2003 | Zeller et al. | 426/89 |
| 6,689,398 B2 * | 2/2004 | Haridas et al. | 424/757 |
| 6,974,552 B1 * | 12/2005 | Hsu et al. | 252/78.3 |
| 7,150,888 B1 * | 12/2006 | Vail et al. | 424/742 |
| 2005/0161060 A1 * | 7/2005 | Johnson et al. | 134/1.1 |

FOREIGN PATENT DOCUMENTS

| | | |
|---|---|---|
| EP | 1332201 A1 | 8/2003 |
| EP | 1354980 A1 | 10/2003 |
| GB | 194286 | 6/1924 |
| WO | 02/49450 A2 | 6/2002 |

OTHER PUBLICATIONS

Z. Shen, et al; "Use of Adsorbent and Supercritical Carbon Dioxide to Concentrate Flavor Compounds from Orange Oil"; J. Agric. Food Chem.; vol. 50, No. 1; 2002; pp. 154-160; XP002421547.

Schefflre, et al; "Improved Gas Chromatographic Analysis of Naturally Occurring Oxygen-Containing Monoterpenese Following Prefractionation by Liquid-Solid Chromatography"; Chromatographia; vol. 10, No. 11; 1977; pp. 669-677; XP009079501.

Masaki Sato, et al, "Adsorption Process for the Fractionation of Citrus Oil by . . . ", Conf. of Fundamentals of Adsorption, Kluwer Aca. Pub., Boston, MA, 1996, p. 797-804.

Teris A. Van Beek, et al, "Sample Preparation of Standardized Extracts of . . ." Phytochemical Analysis, vol. 7, 1996, p. 185-191.

Vasant D. Deo, et al, "Column Chromatographic Technique For Extra Pure . . . ", Jour. Indian Perfumer 35 (1), 1991, p. 22-23.

J.J.C. Scheffer, et al, "Improved Gas Chromatographic Analysis of Naturally . . . ", Chromatographia, vol. 10, No. II, 1977, p. 669-677.

The Chemical Society of Japan (ed.), "The Fourth Series of Experimental Chemistry, vol. 1, Basic Operation I", Maruzen, pp. 293-299 (1990).

* cited by examiner

SELECTIVE PURIFICATION OF MONO-TERPENES FOR REMOVAL OF OXYGEN CONTAINING SPECIES

BACKGROUND OF THE INVENTION

To produce high purity mono-terpenes (alpha-Terpinene and d-Limonene) for use in electronic materials of construction for integrated circuits is problematic due to the very high purity requirements of the electronics fabrication industry and the necessary electrical properties of materials to have operable devices. Alpha-terpinene, as an example, is extracted from wood chips and is commercially available at its highest purity at around 90% (all % herein are vol. %). At the highest available purity, it still contains four main impurities, with Eucalyptol (1,8-Cineole) ranging from 1-5%. Traditional methods for removing the impurities, such as distillation, are not effective due to the similar boiling points of the desired product and all of the impurities (175-176° C.).

Scheffer, J. J. C; "Improved Gas Chromatographic Analysis of Naturally Occuring Oxygen containing Monoterpenes Following Prefractionation by Liquid—Solid Chromotography"; Chromatographia (November 1977), 10 (11), 669-677, uses carrier solvents, such as ethanol and pentane in a gradient, to separate differing oxygenated monoterpenes along a deactivated silica gel column, which silica gel contains water to maintain its deactivated condition and not isomerizes the oxygenated monoterpenes. The products must be separated from the eluting solvent and the silica gel must be deactivated to avoid isomerizing the products.

GB 194286 discloses that essential oils and terpene hydrocarbons are purified by treatment with a suitable material which reacts with the impurities present, then adding an "agglomerating agent," and finally removing the solid substances. As agents for acting upon the impurities, "active" halogen compounds, such as alkali or alkaline earth hypochlorites are mentioned, fuller's earth, silica gel, boneblack or other decolorizing charcoal are given as examples of the "agglomerating agents"; while the starting materials specified are oils of copaiba, fir cones, ginger, juniper, pepper, pine, cedar and peppermint, as well as pinene, dipentene, limonene and isoprene. This process uses water in the separation process and reacts the sulfur containing compounds which cause odor before agglomerating the reacted compounds on materials such as silica gel before mechanical separation of the desired turpentine product.

The present invention overcomes the deficiencies of the prior art in purifying mono-terpenes of oxygen-containing impurity compounds without the requirement for the use of additional chemical reagents or elution solvents so as to recover a neat product and recognizing the particular detriment of such oxygen-containing impurity compounds in electronic materials use, as will be set forth in greater detail below.

BRIEF SUMMARY OF THE INVENTION

The present invention is a method for preparing mono terpenes as porogens for porous silicon oxide dielectric film depositions in electronic devices by separating oxygen-containing impurity compounds from mono terpenes, comprising;

providing a neat mono terpene containing oxygen-containing impurity compounds;

providing an activated silica gel preparative chromatographic column;

contacting the neat mono terpene containing oxygen-containing impurity compounds with the column;

retaining the oxygen-containing impurity compounds on the column; and recovering neat mono terpenes depleted of oxygen-containing impurity compounds from the column.

DETAILED DESCRIPTION OF THE INVENTION

Figure 1:
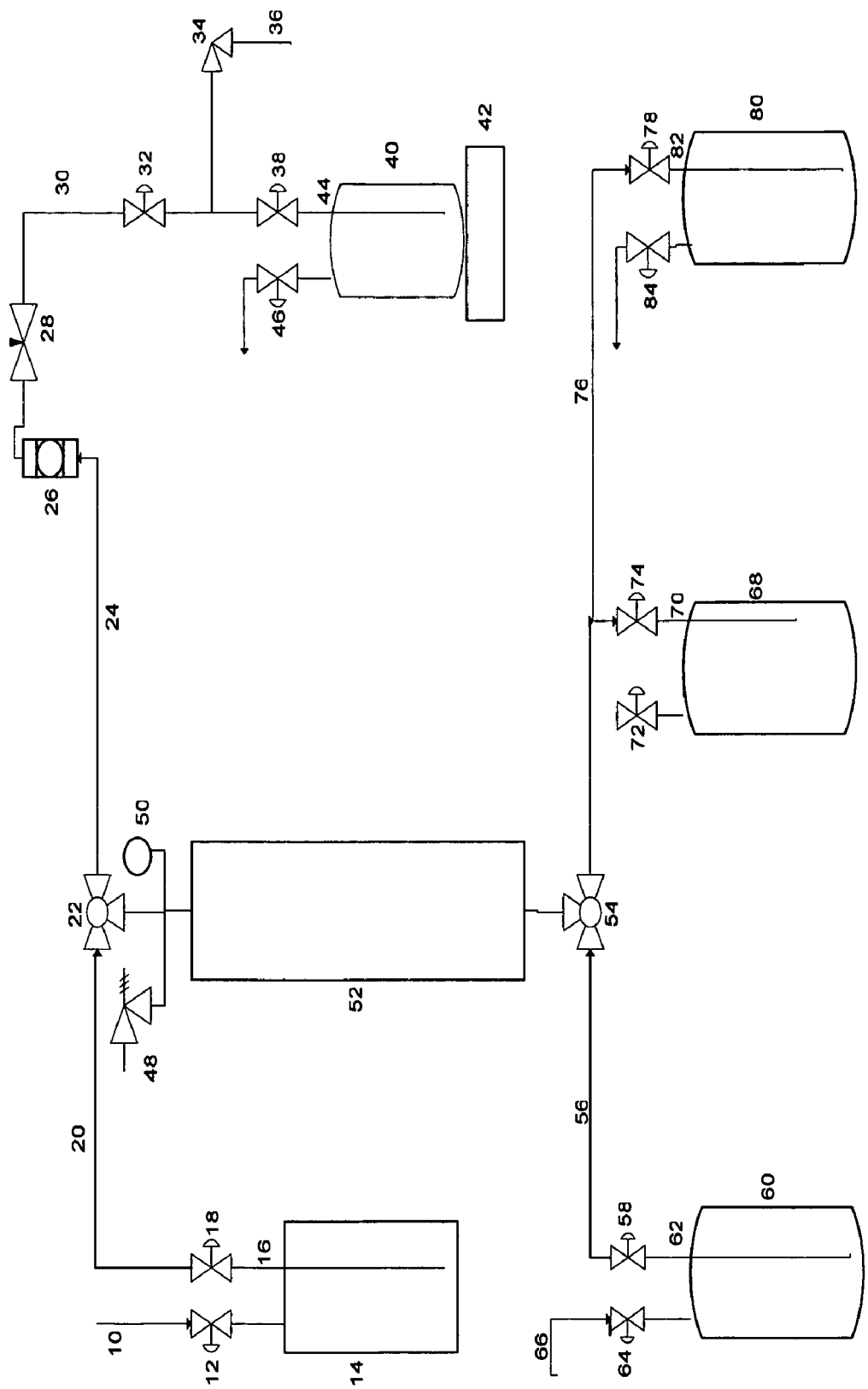
FIG. 1 is a schematic process flow diagram of a preferred embodiment of the present invention for purifying mono-terpenes of oxygen-containing impurity compounds using silica gel column chromatography.

The present invention is a novel process that was developed to purify preferably $C_{10}H_{16}$ mono-terpenes, which are useful as porogens in porous silicon oxide dielectric film deposition processes using silicon oxide precursors, such as diethoxymethylsilane (DEMS) for manufacture of integrated circuits for electronic device fabrication;

Two porogens that are commonly used are alpha-Terpinene and d-Limonene. Both porogen species are extracted from natural products, wood chips and citrus peels respectively and contain several impurities of varying levels. Commercially available grades of these materials are typically quite poor, compared to typical semiconductor precursors, as the main usage is for flavor and aroma products. Alpha-Terpinene purity varies from 90-95% for the highest quality material on the market and contains four major impurities: alpha-Phellandrene ($C_{10}H_{16}$), d-Limonene ($C_{10}H_{16}$), para-Cymene ($C_{10}H_{14}$) and 1,8-Cineole (Eucalyptol) or possibly 1,4-Cineole The mono-terpene desired for the present invention is used as a pore generator with a silicon matrix during dielectric film deposition for electronic device manufacture such as integrated circuit fabrication, and during post film processing, the porogen component is removed. All of the above-recited impurities, except 1,8-Cineole or possibly 1,4-cineole, would function as a replacement for alpha-Terpinene, maintaining a similar pore size and distribution.

Eucalyptol, an ether bridged oxygen species, $C_{10}H_{18}O$, is structurally different from the other impurities in the porogen material and would generate a different pore size and distribution in the silicon oxide dielectric film with varying levels of the impurity. All of the components have the same boiling point (175-176° C.) and are not separable by distillation. D-Limonene, extracted from orange peels, also contains some oxygen containing species, such as Linalool ($C_{10}H_{18}O$) and Octanal ($C_8H_{16}O$), that would have an effect on the DEMS dielectric film deposition process for electronic device applications. Trials were conducted with different media to evaluate the effectiveness of removing the impurities. It was unexpectedly found that passing neat mono terpene feed stock over activated silica gel selectively held the oxygen containing specie(s), before a sharp breakthrough, without effecting concentration of the other terpenes, which are all useful as the above-recited porogen. The unexpected discovery of the sharp breakthrough of the oxygen containing specie(s) provides a desired property for commercial scale separation and engineering scale up of the separation and mono terpene commercial production without undue loses of the desired mono terpenes, which would otherwise adversely impact yields of the desired mono terpenes.

To produce high purity mono-terpenes (alpha-Terpinene and d-Limonene) for use, for instance, as a porogen in chemical vapor deposition (CVD) porous silicon oxide dielectric film deposition processes, using DEMS, for electronic materials manufacture in electronic device fabrication, the present inventor evaluated chromatographic purification as a method to purify these mono-terpenes.

Alpha-Terpinene, as an example, is extracted from wood chips and is commercially available at its highest purity at around 90%. At the highest available purity it still contains four main impurities, with 1,8-Cineole ranging from 1-5%. Traditional methods for removing the impurities, such as distillation, would not be effective due to the similar boiling points of the desired product and all of the impurities (175-176° C.).

Using activated silica gel allows an efficient separation of the non-oxygen containing species from the oxygen-containing impurity compounds, such as Eucalyptol. As an example, during media evaluation tests, activated silica gel was able to reduce 1,8-Cineole levels from 3.45% to approximately 0.024% in activated silica gel column-treated alpha-Terpinene.

The proposed mechanism for this selective purification, although not wanting to be bound to any particular theory, is that the bridged oxygen species found as oxygen-containing impurity compounds in the mono-terpenes are susceptible to hydrogen bonding on the activated silica gels' —SiOH terminal groups. The activated silica gel also demonstrates a high affinity to remove free water in the mono terpene stream left over from steam distillation. The terminal hydroxyl groups on the silica gel will retain polar molecules, such as free water and the oxygen-containing impurity compounds preferentially over the non-oxygen containing desired terpenes, before an unexpectedly sharp breakthrough of the oxygen-containing impurity compounds occurs from the activated silica gel column.

Since the forces holding the oxygen-containing impurity compound species are relatively weak, they are easy to displace during regeneration by the low molecular weight alcohol, but strong enough to hold the oxygen-containing impurity compounds during the purification run without significant 'desorption' off the silica gel media.

When breakthrough of the oxygen-containing impurity compound, Eucalyptol, is detected in the silica gel column effluent, the silica gel column is regenerated by first draining the liquid from the silica gel column and then running a low molecular weight alcohol, such as; ethanol, propanol, isopropanol in reverse flow direction (countercurrent to mono terpene feed flow) to displace the bound oxygen-containing impurity compound material. The vapor pressure of the alcohol is quite high compared to the terpene and can be driven off under vacuum. High temperature reactivates the Si—OH terminal groups of the activated silica gel for the next purification run.

Eucalyptol is an undesirable impurity in the alpha-Terpinene due to its structural differences. During plasma-enhanced chemical vapor deposition (PECVD) of porous dielectric films from DEMS in electronic materials manufacture for electronic device fabrication, the ether oxygen in the Eucalyptol breaks and links with the silicon source (DEMS) forming a strong Si—O bond. Since the objective of the terpene is as a pore generator in the porous dielectric film and then to be removed from the film after pore formation during the post treatment process, the formation of the Si—O—C— bond between DEMS and Eucalyptol results in a "filled" pore, where the porogen is integrated into the silicon matrix and cannot be removed. This directly adversely effects the dielectric constant of the film with increased retained carbon and a changed pore distribution.

As alpha-terpinene is a natural product, the Eucalyptol levels vary depending on the wood stock feed used. Having unpredictable Eucalyptol levels prevents a reproducible porous dielectric film manufacturing process for the integrated circuit or electronic materials fabricators, as each batch of alpha-Terpinene used integrates different amounts of "filled" pores and variable amount of carbon, based upon the Eucalyptol levels. This degree of variability is highly unacceptable to the exacting requirements of the electronic device fabricating industry, which operates with extremely tight dimensions and precise physical and electrical properties of precursor materials. Significantly reducing the Eucalyptol and other oxygen-containing impurity compound levels in the terpene feed allows for a more definable electronic device fabrication process with consistent dielectric film results.

A preferred embodiment of the purification process of the present invention is exemplified with reference to FIG. 1, as follows: a stainless steel column 52 is packed with Davisil silica gel and regenerated under a heated vacuum cycle to remove surface bound water. The column 52 is allowed to cool to room temperature. The system is operated as a pressure push to vent system with the pressure drop occurring at valve 28. Neat mono-terpene (alpha-Terpinene or d-Limonene) containing oxygen-containing impurity compounds is pushed up the column 52 from a source container 60 using a pressure above atmospheric to 100 psig from an inert push gas source 66. The terpene product depleted of oxygen-containing impurity compounds is removed through valve 22, line 24, filtered through filter 26, flow is metered through valve 28, line 30, valve 32 and 38 to be collected in purified terpene product container 40 receiving terpene through diptube 44 with pressure relieved to a vent through valve 46. The terpene product can be drawn off through valve 34 into a customer-use vessel for use as the porogen in the porous dielectric film deposition process for electronic materials manufacture in electronic device fabrication. Production can be monitored by scale 42 and pressure gauge 50. Pressure can be regulated in part by valve 48. The material collected off the top (product or downstream end) of the column 52 is periodically sampled through sample valve 34 and sample line 36 to monitor when the impuritiy level of the oxygen-containing impurity compound starts to rise (break-through). Collection is then stopped. Liquid in the column 52 is drained through valve 54 into a separate mono terpene collection container 68 (column drains) through valve 74 and diptube 70 as it contains high levels of the impurity. This can be periodically removed through valve 74 for further processing through the system. Container 68 may be vented through valve 72, if necessary. From the top of the column (reverse direction or countercurrent of terpene flow), neat alcohol from alcohol source container 14 is dispensed in diptube 16 and valve 18 by inert push gas source 10 through valve 12 and is passed through line 20 and valve 22 down the column 52 countercurrent to the production flow of terpene to displace the oxygen-containing impurity compound from the column through valve 54, line 76, valve 78 and diptube 82 into oxygen-containing impurity compound receiving container 80.

Container 80 can be vented through valve 84. If desirable, the pure alcohol can be recovered from flush container 80 through normal distillation techniques to refill container 14 for further use. Since the vapor pressure of the alcohol is quite high compared to the terpenes, the column 52 can be easily regenerated under vacuum and heated to drive off the alcohol. Once cool, the column 52 is ready for the next run.

The activated silica gel has terminal hydroxyl groups that are good for hydrogen bonding of selective species. The terminal groups will hold polar molecules, such as free water and the oxygen containing species, preferentially over the non-oxygen containing terpenes. Since the forces holding the oxygen containing species are relatively weak, they are easy to displace during regeneration by the low molecular weight and more polar alcohol, but strong enough to hold the oxygen terpene to the gel during the purification runs without significant desorption.

Silica gel contains terminal hydroxyl groups on the surface. These groups are hydrophilic and have a propensity to bond polar molecules. Using this effect, hydrogen bonding, the oxygen bridged species is selectively removed from the mono-terpene as the raw material is passed through the column. Eucalyptol continues to be removed from the mass transfer zone (the silica gel packed column) until the media is saturated and the impurity breaks through into the effluent. The silica gel also has a high affinity for trace moisture in the product (residual from steam distillation) and can remove free moisture at 500 ppm levels to below 40 ppm.

Since the impurity has a high affinity for the media, another polar molecule is used to desorb it from the media. In this case a low molecular weight alcohol is used, ethanol or isopropanol. The solvent is then readily stripped out of the column under vacuum and under heat to regenerate the bed, again leaving free terminal hydroxyl groups, ready for the next purification run.

For example, alpha Terpinene with a starting percentage of 2.36% Eucalyptol, passing through the silica gel column can reduce the level to below detectable limits by a flame ionization detector (FID) on a gas chromatograph. A column packed with 927 cubic centimeters of silica gel is able to purify 5 kilograms of alpha-Terpinene with no Eucalyptol present in the collect terpene fraction The mass ratio between feed material to gel with 2.4% Eucalyptol is 6.6:1 to reduce below 0.05% and 4:1 for 0% Eucalyptol. Flow rate of the feed through the system was 100 grams per minute.

In summary, the mono-terpenes are naturally derived products, and as such, contain a number of similar structured impurities. Typical high purity commodity market Alpha-terpinene, as an example, would be 90% alpha-Terpinene with 5 impurities all with the same boiling point: alpha-Phellandrene, para-Cymene, d-Limonene, 1,8 Cineole and 3-Carene. Since the boiling points are the same, typical purification methods, such as fractional distillation are not effective to separate out the impurities. This purity level is sufficient for the flavor and aroma applications that these products are primarily used in, but not of a sufficiently high purity for the semiconductor market. Other methods to remove the impurities require azeotrope formation or other complexes, precipitation and then further distillation. This process allows neat terpenes to be used without solvents and without precipitation, filtration and distillation to remove the oxygen species.

Chromatography of the terpene, at room temperature, allows for selective removal of the oxygen containing impurity compound from the liquid phase. The present invention allows for significant purity improvement to the final product, with typical alpha-Terpinene purities at greater than 97% after column purification, with the other impurities acting as similar porogen placeholders. Advantage of this process is that the mono-terpene is purified neat without the use of a carrier solvent or the need for a reverse phase solvent. Removing the oxygen-containing impurity compounds significantly reduces the likelihood that the porogen becomes entrapped in the silicon matrix during the plasma deposition process, reducing the number of filled pores and the amount of entrained carbon.

Figure 2:
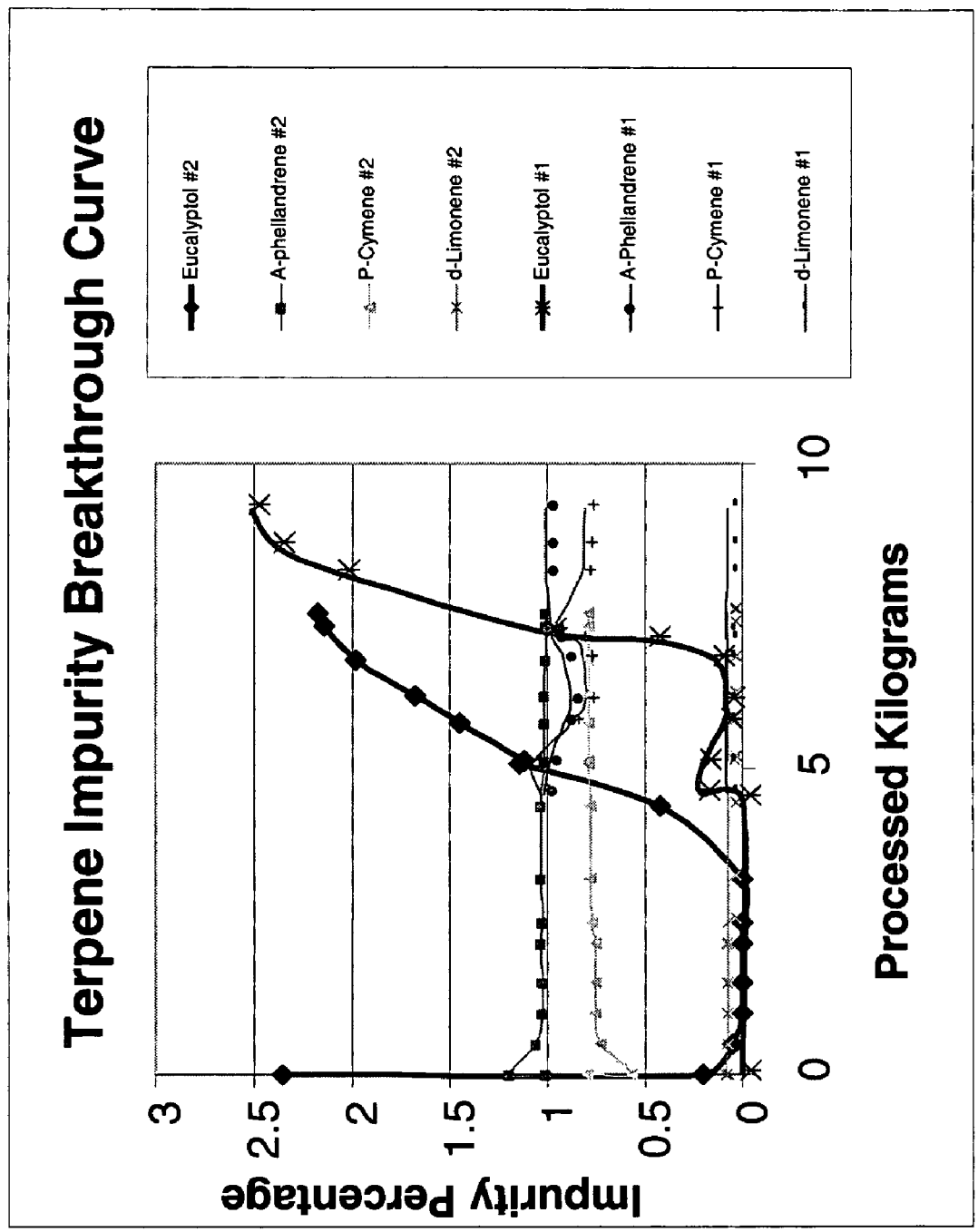
FIG. 2 is a graph showing breakthrough curves at the downstream end of silica gel packed column 52 showing Eucalyptol Runs #1 and #2 are effectively held up on the silica gel column until a sharp final breakthrough in contrast to the steadystate passage of non-oxygen-containing mono terpenes.

The FIG. 2 graph shows the unexpected results of the present invention in dramatically, selectively removing the Eucalyptol oxygen-containing impuritiy compound with minimal change to the starting percentage of the product terpenes. The graph shows a sharp breakthrough of Eucalyptol, making the operation of the separatory process of the present invention convenient and operable on a commercial scale, wherein production of the desired mono-terpenes is unaffected by the silica gel column packing, while the oxygen-containing impurity compounds are effectively bound by the silica gel column packing up until the time for regeneration of the column with alcohol. The prior art has not suggested or reported the significant distinction of the passage of non-oxygen-containing product mono terpenes from oxygen-containing impurity compounds, such as Eucalyptol, to provide very high purity, ease of operation and readily planned regeneration for full scale commercial production of mono terpenes for the exacting requirements of electronic materials applications, such as pore formers in porous silicon oxide dielectric films in integrated circuits, where uniform pore size distribution and uniformity of pore density is critical to to the success of dielectric films for integrated circuit applications.

Figure 3:
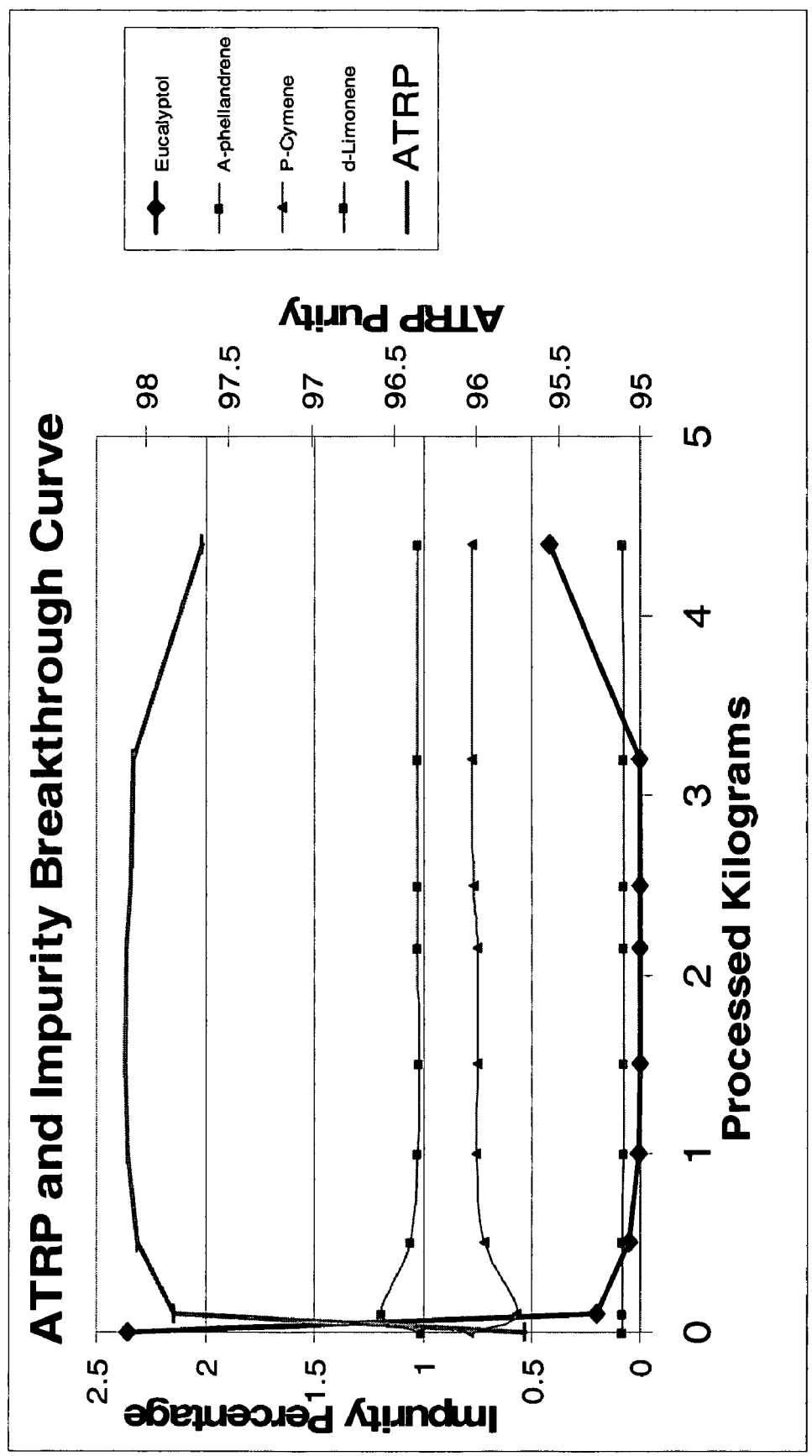
FIG. 3 is a graph showing the product elution at the downsteam end of the activated silica gel column 52 for one individual run of the system demonstrating purity improvements in the alpha-Terpinene product stream with the removal of the Eucalyptol impurity.

FIG. 3 details the result of a single purification run. Alpha-Terpinene with a starting purity of 95.7% was passed through a regenerated column using a 7 psig inert gas push and a flow rate of 100 grams per minute. After an initial elution of the previous runs material out of the filter, the process stabilizes after the first 0.1 kg collected. Alpha-Terpinene purity rises conjointly with the removal of Eucalyptol from the feed steam. Overall, alpha-Terpinene purity was increased to 98.1%. Again, as with FIG. 2, unexpectedly, Eucalyptol breakthrough is sharp, allowing for precise processing at commercial scale to purify the mono terpenes, such as alpha-Terpinene, over the full use of the silica gel chromatographic column without purity degradation by Eucalyptol, until that sharp breakthrough occurs. When Eucalyptol breakthrough is detected, the process is stopped. The mass ratio between processed feed material with 2.35% Eucalyptol to silica gel was 5.15:1 for this run. The column contains 927 cubic centimeters of silica gel. The silica gel has a surface area of 480 square meters per gram with a total of 600,000 square meters of surface area within the column. The other monitored impurities undergo a similar stabilization process during the initial process start up and then maintain feed levels through the chromatographic run.

The present invention has been set forth with regard to one or more preferred embodiments, but the full scope of the present invention should be ascertained from the claims which follow.

The invention claimed is:

1. A process for purifying monoterpenes, comprising the steps of:
    providing a monoterpene comprising alpha terpinene of about 90% or greater purity and comprising an oxygen-containing impurity compound selected from the group consisting of 1,8-cineole, 1,4,-cineole, and mixtures thereof;
    providing an activated silica gel preparative chromatographic column;

contacting the monterpene with the column, wherein the oxygen-containing impurity compounds are retained on the column;

recovering monterpenes depleted of oxygen-containing impurity compounds from the column by applying a pressure above atmospheric from a gas source; and removing the oxygen-containing impurity compounds by contacting the column with an alcohol.

2. The process of claim 1 wherein the contacting step is discontinued when the oxygen-containing impurity compound is no longer retained on the column.

3. The process of claim 1 wherein the monoterpene further comprises one or more monoterpenes selected from the group consisting of: d-limonene, alpha phellandrene, para cymene, and mixtures thereof.

4. The process of claim 1 wherein the oxygen-containing impurity compounds further comprises one or more of linalool, octanol, and water.

5. The process of claim 1 wherein the contacting step is conducted at ambient temperature, and pressures between 0-100 psi.

6. The process of claim 1 wherein the monoterpenes recovered from the column have an oxygen-containing impurity compound content of no more than 10 ppm and a water content of no more than 40 ppm.

7. The process of claim 1 wherein the alcohol is selected from the group consisting of: ethanol, propanol, isopropanol, and mixtures thereof.

8. The process of claim 1 wherein the oxygen-containing impurity compound is 1,8-cineole.

9. A process for purifying monoterpenes comprising the steps of:

providing a monoterpene comprising alpha terpinene of about 90% or greater purity, wherein the neat monoterpene comprises at least one oxygen-containing impurity compound selected from the group consisting of: 1,8-cineole, 1,4-cineole, and mixtures thereof;

providing an activated silica gel preparative chromatographic column;

contacting the monterpene containing oxygen-containing impurity compounds with the column, wherein the oxygen-containing impurity compounds are retained on the column;

recovering monterpenes depleted of oxygen-containing impurity compounds from the column by applying a pressure above atmospheric from a gas source;

discontinuing the contacting when the oxygen-containing impurity compounds are no longer retained on the compound; and removing the oxygen-containing impurity compounds by contacting the column with an alcohol and recovering a mixture of the alcohol and the retained oxygen-containing impurity compounds from the column.

10. A process for purifying monoterpenes comprising the steps of:

providing a monterpene comprising alpha terpinene of about 90% or greater purity, wherein the neat monoterpene comprises at least one oxygen-containing impurity compound selected from the group consisting of 1,8-cineole, 1,4-cineole, and mixtures thereof in a monoterpene source container;

providing an activated silica gel preparative chromatographic column connected to the monoterpene source container;

dispensing the monoterpene from the monoterpene source container using an inert pressurizing gas to contact the monoterpene on the column, wherein the oxygen-containing impurity compounds are retained on the column;

recovering monoterpenes depleted of oxygen-containing impurity compounds from column by applying a pressure above atmospheric from a gas source;

discontinuing the contacting when the oxygen-containing impurity compounds are no longer retained on the column; and removing the oxygen-containing impurity compounds by dispensing an alcohol from an alcohol source container and contacting the column with the alcohol and recovering a mixture of the alcohol and the column-retained oxygen-containing impurity compounds from the column.

11. A process for purifying alpha terpinene comprising the steps of:

providing alpha terpinene of about 90% or greater purity comprising 1,8-cineole;

providing an activated silica gel preparative chromatographic column;

contacting the alpha terpinene containing 1,8-cineole with the column, wherein the 1,8-cineole on the column is retained on the column;

recovering alpha terpinene depleted of the 1,8-cineole from the column by applying a pressure above atmospheric from a gas source;

discontinuing the contacting when the 1,8-cineole is no longer retained on the column; and removing the 1,8-cineole by contacting the column with an alcohol and recovering a mixture of the alcohol and the 1,8-cineole from the column.

* * * * *

UNITED STATES PATENT AND TRADEMARK OFFICE
CERTIFICATE OF CORRECTION

PATENT NO. : 7,727,401 B2  Page 1 of 1
APPLICATION NO. : 10/984108
DATED : June 1, 2010
INVENTOR(S) : Heather Regina Bowen It is certified that error appears in the above-identified patent and that said Letters Patent is hereby corrected as shown below:

Column 6, Line 61
In claim 1 delete the word "alpha terpinene" replace with -- alpha-terpinene --

Column 6, Line 64
In claim 1 delete the word "of" and replace with -- of: --
In claim 1 delete the word "1,4,-cineole," and replace with -- 1,4-cineole, --

Column 7, Line 4
In claim 1 delete the word "monterpenes" and replace with -- monoterpenes --

Column 7, Line 18
In claim 4 delete the word "octanol" and replace with -- octanal --

Column 7, Line 21
In claim 5 delete the word "psi" and replace with -- psig --

Column 8, Line 7
In claim 10 delete the word "monterpene" and replace with -- monoterpene --

Column 8, Line 10
In claim 10 delete the word "of" and replace with -- of: --

Signed and Sealed this

Twenty-seventh Day of July, 2010

David J. Kappos
*Director of the United States Patent and Trademark Office*